April 18, 1933.  R. MAW  1,904,496
HYDRAULIC TRANSMISSION SYSTEM
Filed March 30, 1929  6 Sheets-Sheet 1

Fig. 1.

Inventor
Robert Maw
By Attorney
Warfield + Watson

April 18, 1933.　　　R. MAW　　　1,904,496
HYDRAULIC TRANSMISSION SYSTEM
Filed March 30, 1929　　6 Sheets-Sheet 2

Fig. 2.

Inventor
Robert Maw
By Attorney
Warfield + Watson

April 18, 1933.   R. MAW   1,904,496
HYDRAULIC TRANSMISSION SYSTEM
Filed March 30, 1929   6 Sheets-Sheet 3

Inventor
Robert Maw
By Attorney
Warfield + Watson

April 18, 1933.   R. MAW   1,904,496
HYDRAULIC TRANSMISSION SYSTEM
Filed March 30, 1929   6 Sheets-Sheet 4

Inventor
Robert Maw
By Attorney
Warfield & Watson

April 18, 1933.　　　　R. MAW　　　　1,904,496
HYDRAULIC TRANSMISSION SYSTEM
Filed March 30, 1929　　　6 Sheets-Sheet 5

April 18, 1933.    R. MAW    1,904,496
HYDRAULIC TRANSMISSION SYSTEM
Filed March 30, 1929    6 Sheets-Sheet 6

Inventor
Robert Maw
By Attorney
Warfield & Watson

Patented Apr. 18, 1933

1,904,496

UNITED STATES PATENT OFFICE

ROBERT MAW, OF MONTREAL, QUEBEC, CANADA

HYDRAULIC TRANSMISSION SYSTEM

Application filed March 30, 1929. Serial No. 351,329.

This invention relates to hydraulic transmission systems and particularly to variable speed hydraulic transmission systems.

The invention has for its object generally an improved construction and arrangement of parts in devices of the character described which is efficient, economical and readily manufactured.

More specifically an object is to provide an improved system comprising hydraulically coupled engines in which the speed and torque may be readily varied.

Another object is to provide an improved system of the character indicated having hydraulic engines coupled by means of a rigid conduit arranged to effect fluid continuity in the circulation of working fluid.

A further object is to provide a hydraulic transmission system in which the pressure of the working fluid exchanged between engines is confined substantially to the fluid circulating passages thereby avoiding any substantial pressure in the engine casings.

A further object is to provide a hydraulic transmission system which is self-contained and in which the storage space for a supply of working fluid in excess of that normally circulated is greatly reduced.

A further object is to provide a hydraulic engine of the rotary variety in which the mutual reaction between pistons and cylinders or other moving parts is transmitted directly to the casing without traversing the valve structure or engine parts, thereby avoiding causing stresses therein due directly to the load.

A further object is to provide a hydraulic engine of the rotary variety with an improved valve structure whereby continuous movement of working fluid is accomplished in changing from cylinder to cylinder without shock and without leakage.

A further object is to provide a hydraulic engine with improved means for varying the eccentricity of the co-acting members which produce piston displacement so that there is substantially no binding or slippage, while at the same time achieving precise adjustment.

A further object is to provide hydraulic engines and the like having rotating parts with an improved arrangement of thrust bearings of an anti-friction variety whereby they also serve as packing glands.

A still further object is to provide an improved antifriction reciprocating device for actuating with precision the eccentric members of rotary machines or mechanism required to be linearly movable to-and-fro, whereby there is relatively little lost motion and substantially very little friction.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

In hydraulic transmission systems having mechanically driven and driving engines hydraulically coupled for the mutual exchange by displacement of operating fluid in order to transmit driving force, a variation of the displacement, for producing speed variations, may be accomplished in either of two ways, first, by employing engines of fixed displacement and by-passing a portion of the operating fluid, and second, by employing engines in one of which the displacement may be varied. The second type is the more efficient and it is to this type that the present invention especially relates.

In the practise of the invention, the fluid displacement is accomplished by providing cylinders having pistons that are reciprocated by the relative rotation of eccentrically disposed members associated respectively with the cylinders and pistons. In devices of this character, it has been found generally preferable to vary the fluid displacement of the mechanically driven engine since as by this arrangement fluid slippage is reduced substantially to a minimum and precise regulation and high efficiencies result. In the system here illustrated, the mechanically driven engine is shown generally in Fig. 1, while the driving engine is similarly shown in Fig. 2; the two figures, being complements, so that when taken together, they illustrate as a whole a longitudinal cross-section of a single device of the present invention, such as is shown in side elevation on reduced scale in Fig. 19.

The working fluid employed in accordance with the present invention may be any relatively incompressible fluid which does not readily break down and preferably has lubricating properties in addition. Water may be used but it is liable to evaporate. Other highly incompressible liquids and solutions which have good body and relatively low viscosities may also be used. Light petroleum oils, however, are preferred.

*The system in general*

Figure 1:
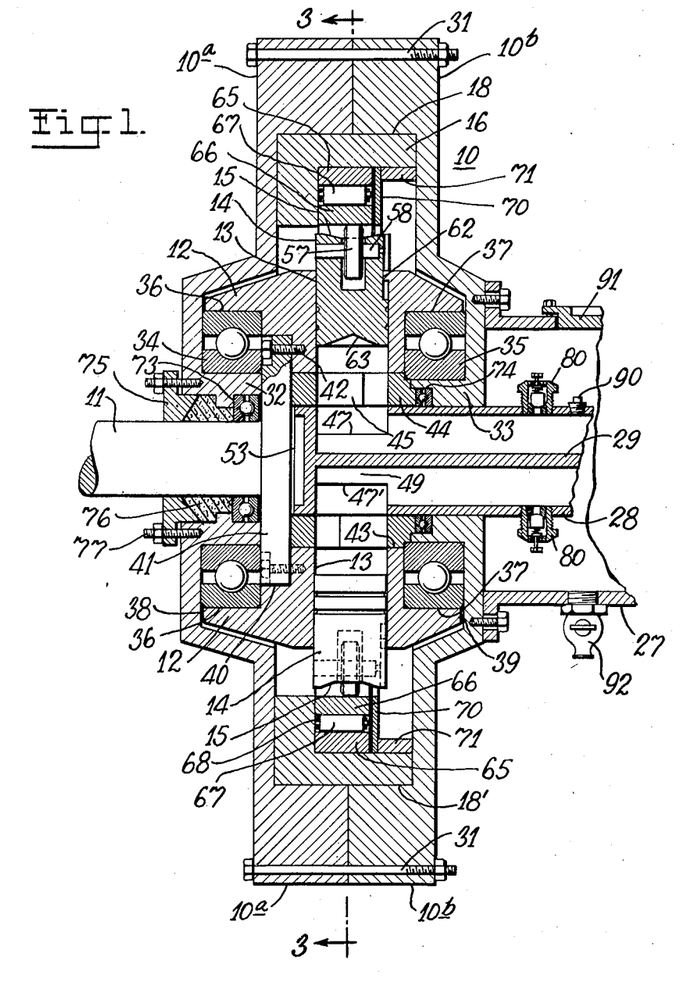
Fig. 1 is a view mainly in vertical cross-section showing a hydraulic engine adapted to be driven as a pump in a hydraulic system constructed in accordance with the invention.

Referring now particularly to Fig. 1, 10 denotes generally the casing of the driven engine or pump which is provided with a rotating member comprising a shaft 11 and a rigidly attached block or cylinder member 12; the latter has a series of radially disposed bores 13, which serve as cylinders, each having a co-operating piston member 14 adapted to reciprocate therein. These pistons have their outer ends 15 disposed generally to transmit thrust and bear against an eccentric member 16 operatively associated with the casing 10. The members 12 and 16 are thus relatively eccentrically disposed, that is, have different centres in casing 10, in order that by their mutual reactions they may effect displacement of the pistons. In order, however, that the displacement of their centres may be varied, the member 16 is movably disposed in the casing 10 and to this end is formed with straight sides, shown at 17 and 17′, respectively, in Figs. 3 and 17, which slide on corresponding straight slide-members 18 and 18′ provided in the casing 10. The position of the member 16 on the slide-members 18 and 18′ is governed by means of a reciprocating or plunger device, shown generally at 19, that has a part secured to the eccentric member and extending through the casing 10 at a convenient point, for purposes of actuation as by a sprocket wheel 145.

Figure 2:
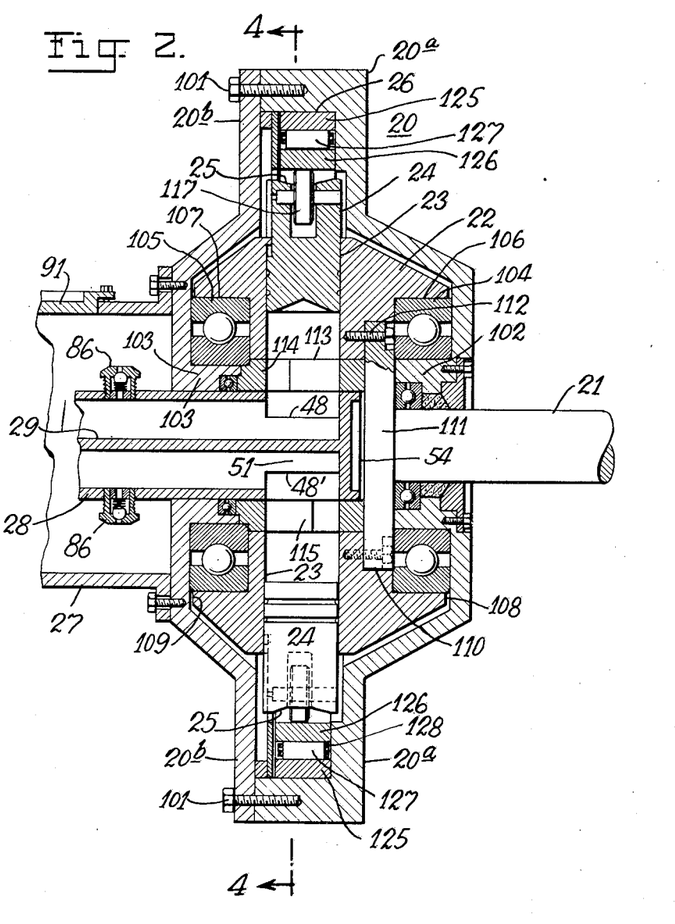
Fig. 2 is a similar view in vertical cross-section showing a hydraulic engine adapted to run as a motor and exert driving force, constructed in accordance with the invention.

In Fig. 2 there is shown generally the engine which runs as a motor for mechanically driving any mechanism to which drivin' force is to be transmitted by the system of the present invention. This engine is generally like the one shown in Fig. 1, except that no means is provided for varying the eccentricity of the reacting members that effect displacement of the pistons.

Here 20 denotes the casing which is provided with a rotating member comprising a shaft 21 and a block or cylinder member 22, the latter having bores 23 and cooperating pistons 24 disposed therein. These pistons have their outer ends 25 designed to transmit thrust and re-act against the member 26 associated with the casing 20 and arranged to have a fixed eccentricity with respect to the member 22.

The casings 10 and 20 are rigidly connected together by the interposed auxiliary member 27 that is bolted or otherwise secured to each of the casings. This connecting member serves, however, not merely as a connecting means for the casings, but also as a reservoir for operating fluid and as a housing for a passage member 28. The member 28 is here shown as having a longitudinal partition 29 forming two passages therein; the member 28 having its ends respectively secured in the casings 10 and 20 and arranged to effect communication between the cylinders in the members 12 and 22. The passages provide hydraulic connection for the driven and driving engines, through which working fluid is caused to flow by the piston displacements of the engines when running.

*Driven engine or pump structure*

The driven engine is constructed so as to be readily assembled and disassembled; the casing 10 is accordingly shown as composed of two separable parts, denoted 10a and 10b, respectively, secured together in any convenient manner, for example, by means of bolts, as shown at 31. The part 10a has a central inwardly projecting boss 32 through which the shaft 11 extends. Similarly the part 10b has a boss 33. In order that the casing may take up directly the entire reaction from the working of the pistons, the block or member 12 is journaled directly on the bosses 32 and 33 in any convenient manner; for example, by means of anti-friction bearings, here shown as of the ball bearing variety, interposed respectively at 34 and 35 between the bosses and the block 12. To facilitate this arrangement, the block 12 has front and rear annular grooves 36 and 37 which fit over the frames of bearings 34 and 35, thereby forming hanging ledges 38 and 39 on the block, which ledges are preferably given a slight taper, in order to lighten the block 12 about its periphery which may rotate at relatively high angular velocities. Thus tapered, the block 12 is seen to have an outside surface that has a central cylindrical portion to which conical portions are joined at either side. These conical portions may not, and preferably do not have the same slope.

In order that the shaft 11 may be rigidly coupled to the block 12 and also conserve space, a second annular groove 40 of less diameter than the groove 36, is cut in the front of the block 12. The diameter of this groove is such that the flanged coupling head 41 formed integrally with the shaft 11 fits therein and is centered with the block. The head 41 is made fast to the block 12 by any suitable securing means, for example, by bolts, as shown at 42.

The block 12 has a central axial bore 43 of a diameter sufficient to receive a separate cylindrical member here shown as a bushing 44 which fits tightly into this bore, and has port openings 45 formed therein and disposed in register with the cylinder bores, so that this bushing serves as a valve for the cylinders. This valve bushing is bored out to have an internal diameter whereby it fits over the ported end of the passage member 28; this diameter being sufficient to give a working fit on the end of the passage member 28. The passage member 28, when properly disposed in the casing 10, has its end which protrudes into the valve bushing 44, so positioned that it serves as a hub about which the cylinder block and its valve bushing freely turn.

This protruding end portion of member 28 has two ports, one on each side of the partition 29, and denoted 47 and 47', respectively. Similar ports are, of course, provided at the other end of the member 28 here denoted 48 and 48', respectively. The ports 47 and 47' are separated by web-wall portions 49 and 50 that are disposed on opposite sides of and formed integral with the partition 29. In like manner, the ports 48 and 48' are separated by web-wall portions 51 and 52. In each case these web-wall portions have an arcuate extent sufficient to cover a port opening in the valve bushing such as shown at 44.

*Valve structure*

The valve structure here employed is such that the operating fluid has continuous movement from cylinder to cylinder when the cylinder blocks in the engines rotate, it being understood that while the valve structure may be integral with the cylinder block, for manufacturing reasons, it is preferably provided by means of a separable member, such as the valve bushing shown at 44. The bushings employed in the two engines, however, are similar. Hence the illustration of details of but one will suffice.

Figure 3:
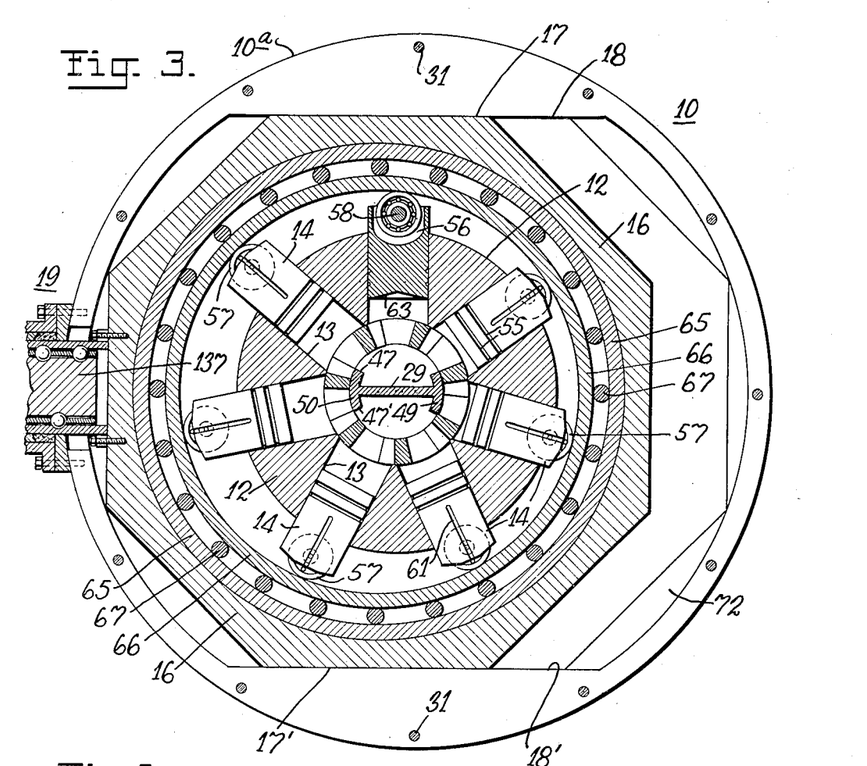
Fig. 3 is a sectional view taken on the line 3—3, looking in the direction of the arrows, in Fig. 1.
Figures 7, 8:
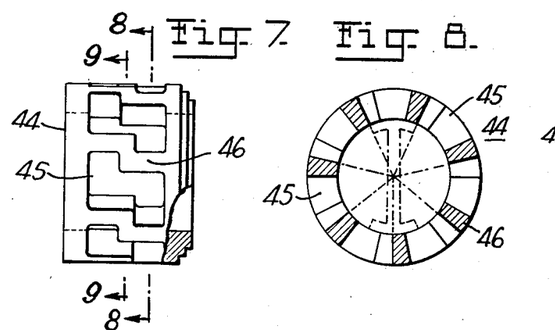
Fig. 7 is a view mainly in side elevation, parts being broken away, showing the valve member or bushing used in conjunction with the hydraulic engines of the present invention in order to obtain continuity in fluid movement from cylinder to cylinder.
Fig. 8 is a cross-sectional view of the valve member shown in Fig. 7 taken on the line 8—8 thereof and looking in the direction of the arrows.
Figure 9:
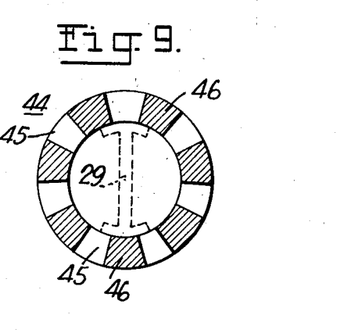
Fig. 9 is a view similar to Fig. 8 showing a cross-section of the valve member taken on the line 9—9 in Fig. 7.

Details of the valve bushing 44 are shown in Figs. 7, 8 and 9, Fig. 8 showing on an enlarged scale the construction shown in Fig. 3 independently of other engine structure. Here a cylindrical body is shown provided with a plurality of elongated openings 45 longitudinally disposed with respect to the axis and distributed circumferentially about the cylindrical surface, these openings being the same in number as the cylindrical bores 13 in the block 12 with which it is to be put in register. The number of cylindrical bores in the block 12 may be, of course, any desired number; an odd number, however, is preferred, since it results in avoiding the occurrence of any positions of balanced dead centres for the cylinder block with respect to the passage member 28. A convenient number of cylindrical bores is seven. The blocks 12 and 22 are here shown by way of example as provided with seven cylinders each, which are radially disposed and equally spaced about the circumference of the respective blocks. The valve bushings in each engine, therefore, have seven ports equally spaced about their operative cylindrical surfaces.

In order to insure continuity of fluid movement, each port opening is provided with lapping components at the ends, the lapping component at one end of an opening being staggered with respect to the lapping component at its other end. By this arrangement it is seen that the lapping components associated with a port opening extend in opposite directions from a medial line drawn lengthwise therethrough, these components being preferably symmetrically formed, so that there is as much area of the valve opening on one side of the medial line as on the other. The angular extent of each lapping component is such that it extends about the circumference of the valve bushing from the medial line a distance corresponding to one-half the arc subtended by a cylinder; for example, where there are seven cylinders, the arc subtended by one cylinder is $\frac{360°}{7}$, or approximately 51° 26′, so that the lapping components of the port opening would extend at each side of the medial line an arcuate distance of approximately 25° 43′.

In the valve structure illustrated in Figs. 3 and 8, the lapping components extend to the left in the portion of the bushing 44 next to the observer, and the components in the portion to the rear extend to the right the same number of degrees. Thus, the port openings in the valve bushing, as here provided, are seen to have staggered components which span substantially completely the arc subtended by one cylinder, so that the cylinder communicates through some portion of a port opening during the whole time that the cylinder is rotating with the block from one position of dead centre to the opposite position of dead centre. (These positions of dead centre are seen to be when the axis of a cylinder is in line with the partition 29 of the passage member 28.) To properly operate the valves, the web-wall portions 49 and 50 are designed to close the port openings in the bushing 44 whenever a cylinder is in a position of dead centre. Also it is seen that the fluid movement to or from a cylinder, as the cylinder moves into a position of dead centre, is no sooner cut off on one side, than the opposite movement begins on the other the instant that the cylinder has passed the dead centre. As a consequence, there are no periods of complete stoppage of fluid movement and no shocks or fluid hammers occasioned by a sudden starting or stoppage in the fluid movement.

From the sections of the valve bushing shown in Figs. 8 and 9, it is seen that there is a narrow web or partition 46 in the wall of the bushing separating the port openings 45 that has a width near a port-end which extends an arcuate distance corresponding to the lap-excess of the opposite staggered component associated with an adjacent port opening. In Fig. 9, the middle portion of the port openings is portrayed. Here it is seen that the separating web has its greatest width, the width being that of twice the lap-excess.

Thus it is seen that the opposite lapping components of two adjacent port openings, in the valve bushing, each extend to and are bounded by a common line drawn on the bushing surface parallel to the axis, so that a component of the second port opening begins where the first component ends. In this way, it is seen that a strong valve member is provided which not only controls the fluid movement between cylinders, but at the same time, extends for a circumferential distance about the bushing which corresponds substantially with the entire arc subtended by a cylinder, so that in effect there is provided continuous cylinder communication from cylinder to cylinder.

Figures 10, 11, 12, 13, 14:
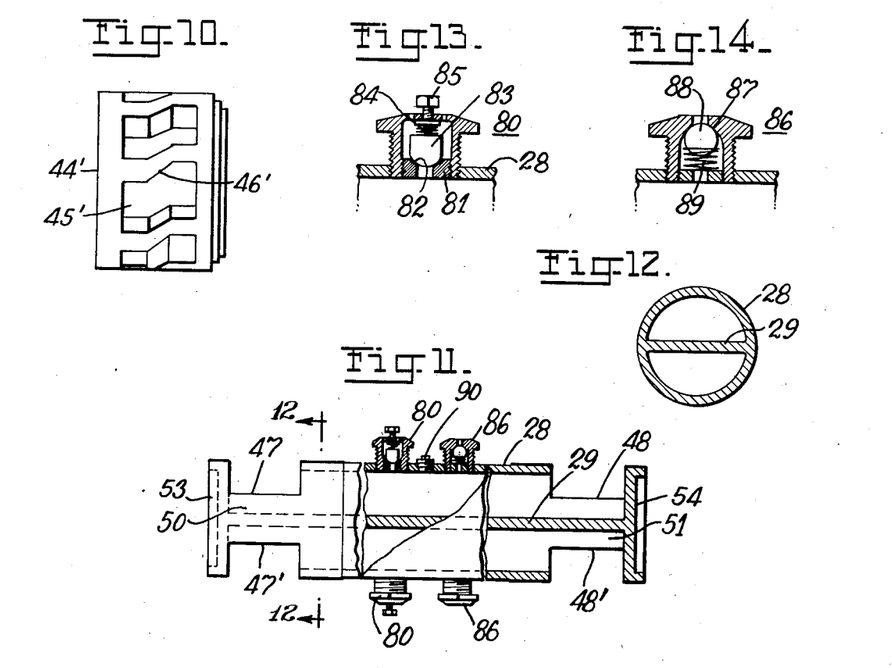
Fig. 10 is a side elevational view of a modified form of valve bushing.
Fig. 11 is a fragmentary view partly in section and partly in elevation, showing the conduit member which connects the hydraulic engines in accordance with the present invention.
Fig. 12 is a sectional view of the conduit member taken on the line 12—12 in Fig. 11.
Figs. 13 and 14 are fragmentary sectional views showing details of the valve devices employed in the conduit member.

While the middle portion of the port openings 45 may extend mainly longitudinally, as shown in Fig. 7, it is by no means essential that this portion be so disposed, as other dispositions may be equally satisfactory; for example, a diagonal disposition, an embodiment of such arrangement being shown in Fig. 10. Here the valve bushing 44′ is provided with port openings 45′ having a diagonally extending middle portion and separating webs 46′.

Piston structure

Figures 15, 16, 17, 18, 19:
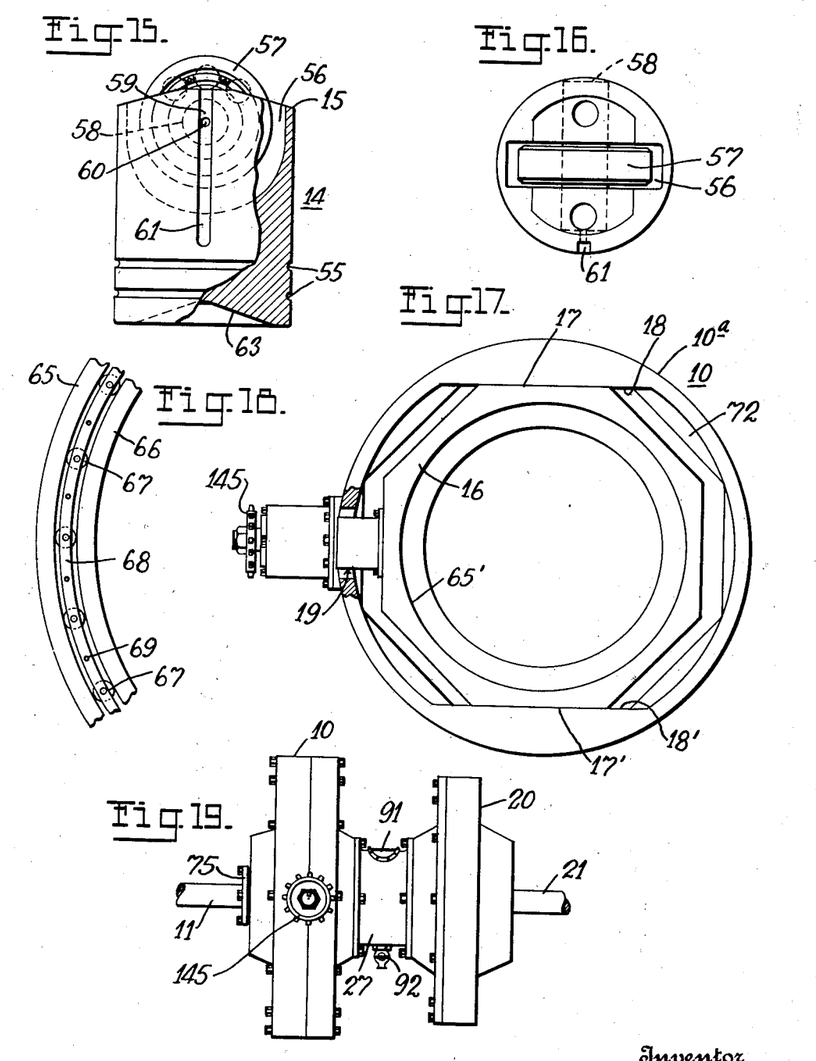
Fig. 15 is an enlarged view partly in elevation and partly in section showing a piston member of the type employed in the present invention.
Fig. 16 is a view in top elevation showing the type of piston member employed in the engines of the present invention.
Fig. 17 is a view partly in section and partly in elevation showing on a reduced scale the eccentric member and the shifting means therefor employed in connection with the engine shown in Fig. 1.
Fig. 18 is a fragmentary view showing a detail in the construction of the movable liner associated with the eccentric member.
Fig. 19 is a side elevation on a reduced scale showing the manner of connecting together the engines illustrated in Figs. 1 and 2.

Details of the structure of a piston, adapted to reciprocate in a cylinder bore of a cylindrical block such as is herein employed, are shown in Figs. 15 and 16. The piston is shown as having the proportions of a piston 14 and has a generally cylindrical body formed with suitable means about its lower end for preventing leakage, such for example, as a plurality of annular grooves 55. The upper end 15 is arranged to transmit thrust with relatively little friction and to this end is provided with a relatively deep groove 56 cut crosswise on a diametrical line in which is disposed a suitable anti-friction transmitting member, for example, an annular ball bearing 57 secured therein by a pin indicated by broken lines at 58. This pin is preferably inserted through a transverse bore formed in one side of the piston, there being a stop at the other side to prevent the pin from sliding endwise therethrough. The stop comprises a wall portion 59 through which is preferably bored a smaller opening 60 whereby an air pocket is avoided. A longitudinal groove or key-way 61 is also provided in one side of the piston member as a means for co-acting with a key or pin, such as shown at 62 (see Fig. 1) disposed in the wall of a cylindrical bore 13, whereby the piston may be reciprocated without rotating about its own axis, when the engine is working. The piston, as shown, also preferably has a suitable counter-bore in its lower or working face, as illustrated at 63, as by this means the piston is lightened and its mechanical efficiency otherwise increased.

Eccentric member structure

The eccentric member 16 is disposed in the engine in working association with the pistons 14 and reacts normally therewith to transmit thrust. In order that this reaction may take place with relatively little friction, a suitable anti-friction device is preferably interposed between the eccentric member proper and the thrust members or ball bearings in the ends of the pistons. This anti-friction device is shown as of the roller bearing variety, and comprises rings 65 and 66 between which are disposed a plurality of rollers 67 held in proper spaced relation and alignment by means of a cage 68. Fig. 18 shows details of this cage. Here it is seen that the cage 68 comprises a pair of annular frame members held together by means of pins 69. To accommodate this anti-friction device, the eccentric member 16 has a large groove 65' formed therein of a size sufficient for the reception of both the rings 65 and 66 and, when in place, have a large washer 70 disposed thereagainst. A spacing ring 71 is shown additionally as interposed between the washer 70 and the casing 10 to keep the parts in place. Thus, it is seen that the anti-friction device cannot be displaced sidewise in the casing when the engine is assembled and the ball bearings 57 have rolling engagement therewith. This ring, when the engine is in working order, is thus free to travel with the rotation of the cylinder block, which it is found to do as a result of the tangential components of the thrust transmitted thereto from the pistons when rotating.

In Fig. 17, the arrangement of the eccentric member with respect to the casing 10 is illustrated independently of rotating parts of the engine. Here it is seen that the inner surface of the eccentric member 16 has the annular groove 65' cut therein about its inner surface to a depth substantially equal to the width of rings 65—66 with their interposed rollers 67 in place. The outside surface of the member is shown faced away at 17 and 17' so as to slide on the slide-members 18 and 18'. The outside surface of the eccentric member 16 may of course have any convenient shape, provided it affords means for effecting the sliding movement for changing the eccentricity thereof with respect to the cylinder block. An octagonal form, as shown in Fig. 17, however, is convenient, since it conserves space and at the same time provides a third flat face at right angles to those at 17 and 17' to which a moving part of the plunger device 19 may be secured in order to effect the sliding movement. The octagonal sides preferably move into snug engagement with one or more filet members 72 which are disposed about the interior of the casing 10. While the casing 10 is here shown, as provided with integral slide-members 18 and 18', it is obvious that where convenience indicates, these sliding members can also be made separately and inserted when assembling the engine.

Thrust bearing structure

The rotating member of the engine here employed while mounted so as to be free at all times to turn on the journals within the casing is preferably provided with special means in order to avoid binding and friction due to end thrusts, and to this end has thrust bearings in addition to the main bearings. Casing 10 for this purpose is shown as having the bosses 32 and 33 interiorly grooved at 73 and 74, respectively, for the reception of annular thrust bearings. One is shown as engaging with shaft 11 and boss 32. It is arranged in groove 73 to fit over the shaft 11 and bear against the flange member 41, and is adapted to transmit the end thrust from the shaft directly to the casing 10. The other thrust bearing is in the groove at 74 and fits over the stationary end of the passage member 28 reacting against the end of the valve bushing 44 which is secured in block 12. Thus positioned, these thrust bearings are adapted to perform a secondary function and tend to prevent oil leakage in any substantial quantity past the same. It is preferred, however, to insure more positively against the possibility of oil leakage past the thrust bearing at 73 to the outside of the casing, by providing additional means, for example, an ordinary packing gland. Such gland is here shown and comprises a packing ring 75 bearing against packing material inserted at 76. This packing ring is drawn into place by means of nuts and bolts shown at 77 in the conventional manner.

*Connecting means structure*

The connecting means, as indicated above, comprises the cylindrical member 27, which serves as a link securing together the casings 10 and 20, and the passage member 28 which provides hydraulic passages for connecting the cylinders in the two engines. This passage member is seen to be a generally cylindrical body comprising a cylindrical wall and end portions and is divided by the longitudinally disposed partition 29 forming two passages therein, one serving as the inlet passage to the pump when the order of increasing piston displacement takes place in one direction, while the other at the same time serves as the outlet passage. When the order of increasing piston displacements is reversed, then the flow of working fluid in the passage member 28 is also reversed. This passage member, as shown in Figs. 1 and 2, is secured against rotation in the bosses on opposing walls of the casings 10 and 20. To this end, it is shown as making a tight fit in the bosses 33 and 103. The passage member 28 is first inserted in the casing 10 when it is so positioned that the longitudinal partition 29 lies in a plane substantially parallel with the ways 18 and 18' of the casing 10.

To form ports in the end portions of the cylindrical wall of the member 28, the wall is cut out crosswise on each side symmetrically with respect to the partition 29. As shown in Fig. 11, such cut away portions are made equally on the upper and lower sides to form ports 47 and 47'. The ports 48 and 48' are similarly formed at the other end. These four ports are seen to have substantially rectangular developments, and are separated by the web-walls 49, 50, 51 and 52 which have straight edges and serve as valve cut-offs and are preferably so disposed with respect to the partition 29, that substantially one-half of each web-wall projects away from the partition, as shown in Fig. 3. The arcuate extent of these web-walls, as noted above, is such as to cover substantially completely one cylinder port in the valve bushing 44, which for a seven-cylindered-engine has an angular extent of one-seventh of a circumference. By thus cutting away the cylindrical wall of member 28, end portions 53 and 54 remain forming disc-like end-walls which are spaced slightly from the heads on shafts 11 and 21 when the passage member 28 is in place.

As the working fluid is relatively incompressible, it is seen that the total displacement of the pistons 24 in the casing 20 must at all times correspond substantially to the total displacement of the pistons 14 in casing 10. In order, however, to allow for transient variations and to compensate for a certain amount of expansion and contraction in the volume of working fluid operatively employed in the engines, it is desirable to provide the passage member 28 with automatic means in the nature of volume regulators or safety valves as shown at 80 in Figs. 1 and 11. Such safety valve is shown in enlarged view in Fig. 13, where it is seen to comprise a hollow plug member 81 adapted to be screwed into the cylindrical wall of the passage member 28 opposite the partition 29 and has communication with one of the passages therein; this member 81 having a valve seat at 82 on which seats a valve 83 that is yieldably held in place by means of a spring 84. This spring is preferably adjustable so that the valve may be unseated at various desired pressures and for this purpose is shown as having an adjusting screw 85.

The working fluid that escapes from these safety valves 80 discharges into the connecting member 27 which is arranged to serve as a reservoir for such fluid as is retained outside of the operating channels of the engines and the connecting passage member.

In order that working fluid may be automatically taken into the system to fill the same and to dislodge and replace air that is expelled through valves 80, the passage member 28 is also provided with additional means here shown as automatic inlet valves 86 disposed to communicate respectively with the passages in the passage member 28. Details of these latter valves are shown in Fig. 14. Here the automatic inlet valve comprises a hollow body member which has an outlet valve seat 87 on which seats a valve 88 held in place under the influence of an interiorly disposed spring 89. Thus, it is seen that when the fluid inside the system contracts or an excessive negative pressure develops, fluid from the reservoir is drawn into the circulating system. For filling purposes, the passage member 28 has a plug 90 communicating with one of its passages which may be opened when the system is to be charged with fluid. In order to afford ready access to the plug 90, the connecting member 27 has a removable cover plate 91 disposed over the plug.

The connecting member when serving as a reservoir is preferably filled with working fluid to a height which is slightly above the inlet plug 90 and the valves 86, since such liquid level keeps the system automatically properly filled.

The connecting member is also shown as provided with a drain at 92, in order that excess or used working fluid may be withdrawn, when desired. The position of the drain, however, is optional, it being understood that drains may be provided throughout the system where convenience dictates.

*Driving engine or motor structure*

The driving engine or motor, while in general like the driven engine or pump, may have relatively different proportions, if desired, for example, if the total piston displacement in the driven engine be approximately twenty-one cubic inches, then the total piston displacement for the driving engine will be of like volume, which may be obtained in the driven engine by seven cylinders employing piston displacements of 1.75 inches diameter by strokes of 1.25 inches and obtained in the driving engine by seven cylinders having piston displacements of approximately 1.5 inches diameter by 1.6 inches of stroke.

The structural details of the driving engine otherwise resemble those of the driven engine. Here casing 20 comprises parts 20a and 20b, the latter being preferably in the form of a cover which is secured to the first in any convenient manner, for example, by means of bolts as shown at 101. The part 20a has an inwardly projecting boss 102 through which the shaft 21 extends. Similarly the part 20b has a boss 103, the block or member 22 being journaled in these bosses in any convenient manner, for example, by means of antifriction bearings, such as the ball bearings shown at 104 and 105, respectively. The block 22 is also provided with annular grooves 106 and 107 for the reception of these bearings and has over-hanging ledges 108 and 109 which react with the bearings and preferably have a slight taper, as shown.

The block 22 is also shown as having a second annular groove 110 in its back face of less diameter than the groove 106, but sufficient to receive the flanged coupling head 111 that is formed integrally with the shaft 21. This head is secured to the block 22 by any suitable means, for example, by bolts as shown at 112. The block 22 has a central bore 113 for the reception of a valve member or bushing 114, which as noted above, is similar to the bushing 44, though it may be of different thickness if the cylinder block 22 be different from block 12. The valve member 114 is accordingly shown as having port openings 115 provided with overlapping components staggered to permit the continuous movement of working fluid from cylinder to cylinder. The port components in the bushing 114 thus would have the same arcuate extent as those shown in bushing 44, where there are seven cylindrical bores in the cylinder block 22. The wall portion 51 on the passage member 28 is also arranged to close completely a port opening 115 when a cylinder is in a position of dead centre.

The port openings 115 are in register with the cylindrical bores 23 and permit the ingress and egress of working fluid to and from the cylinder chambers containing the pistons 24 which latter are generally similar in details to that shown in Figs. 15 and 16 and have anti-friction thrust members 117 adapted to react in operative association with the eccentric member 26. This eccentric member, the eccentricity of which is fixed, is here shown as provided by forming the casing part 20a with an upstanding wall or rim that is eccentrically disposed with respect to the boss 102, the eccentric displacement being adapted to be in line with partition 29 in the passage member 28. In order that the thrust may be transmitted through the pistons 24 and their thrust members 117 with relatively little friction, an anti-friction device of the roller bearing variety is here interposed between the members 117 and the eccentric member 26; this device here comprises a pair of rings 125 and 126 between which rollers 127 are held in properly spaced relation by a cage 128 similar to that shown at 68 in Fig. 18. It is thus seen that when the engine is in working order, the bearing members 117 have rolling engagement with the ring 126 which is free to travel with the rotation of the cylinder block.

*The operation*

In operation, the shaft 11 of the driven engine is connected to a suitable prime mover, for example, an internal combustion engine or an electric motor, and the shaft 21 of the driving engine to the mechanism to which driving force is to be transmitted. When starting the prime mover, the reciprocating device 19 is preferably first moved, so that the eccentric member 16 occupies its neutral position. The prime mover will then cause the rotating member 12 to rotate without causing any displacement of the pistons 14, the pistons under these conditions all occupying positions in their respective cylinders which are midway between the innermost and outermost positions.

When the rotating member starts rotating, it is seen that centrifugal force operates to cause all the pistons 14 to bear against the movable ring 66 of the anti-friction device. The ball bearings 57 consequently contact with and track upon the ring 66 causing it to react and travel with a speed approaching that of the rotating member 12.

If the plunger mechanism 19 be actuated by the wheel 145 to move the eccentric member 16 from the neutral or concentric position to an eccentric position, for example, that shown in full lines in Fig. 3, then the member 16 will act to cause displacement of the pistons 14.

Assuming that the prime mover is causing the rotating member 12 to execute motion of rotating in a counter-clockwise direction, it is seen from Fig. 3 that when a piston passes through the dead centre on the right (that is rotates through the position when the axis is in a horizontal line drawn to the right through the partition 29) it begins to move outwardly, this outward movement beginning at the same instant that the upwardly extending lapping-component of its port opening 45 passes the upper edge of the wall web 49. Consequently, this outward movement of a piston 14, as soon as it leaves the dead centre on the right, produces a drawing in or suction of working fluid from the upper passage in member 28, which suction continues during the entire time the piston moves through the upper half of its arc of travel, i. e. until it reaches a second position of dead centre, which is at the left of partition 29. As the piston approaches this latter position, it is seen to be moving into its outermost position when its cylinder will contain the maximum amount of working fluid. During the instant that the cylinder passes through this second dead centre its port opening is again completely closed, this time by the web-wall 50. During the instant that the port opening is closed, no working fluid flows into or out of the cylinder. As soon, however, as a cylinder has passed this second dead centre, the piston will start to traverse the lower half of its arc of travel and is caused to move inwardly as a result of the reaction from engagement through member 57 with the ring 66 in eccentric member 16. It is also seen that the instant this second dead centre is passed, the port opening 45 of its cylinder is immediately moved into communication through a lapping component with the passage on the lower side of the partition 29 in member 28 so that a discharge from the cylinder takes place. This discharge operates to force working fluid under pressure to flow through the lower passage in the member 28 from the pump into the cylinders of the member 22 in casing 20; this direction of flow continuing as long as the eccentric member 16 is in the position on the left shown in Fig. 3.

Figure 4:
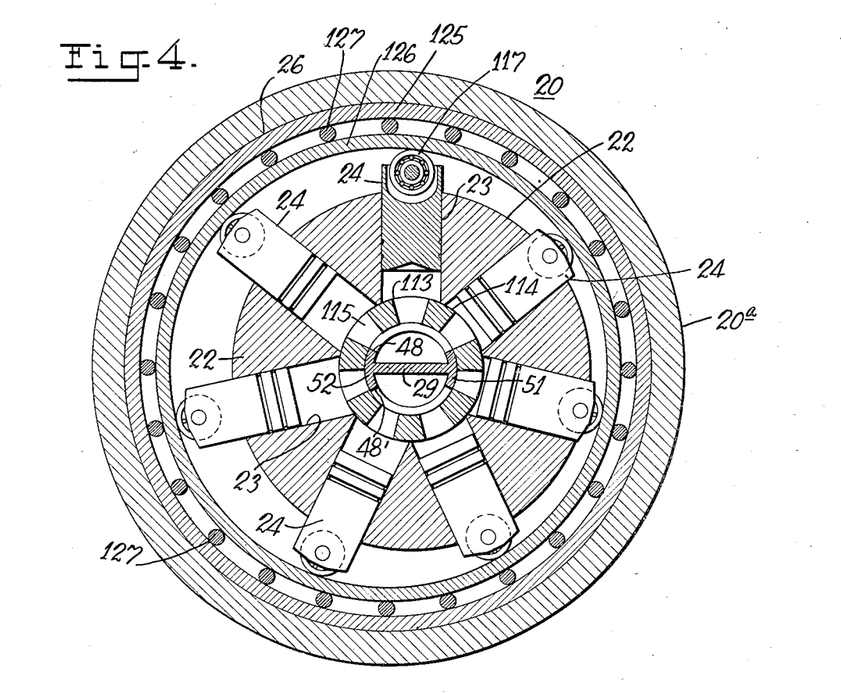
Fig. 4 is a similar sectional view taken on the line 4—4, looking in the direction of the arrows, in Fig. 2.
Figure 5:
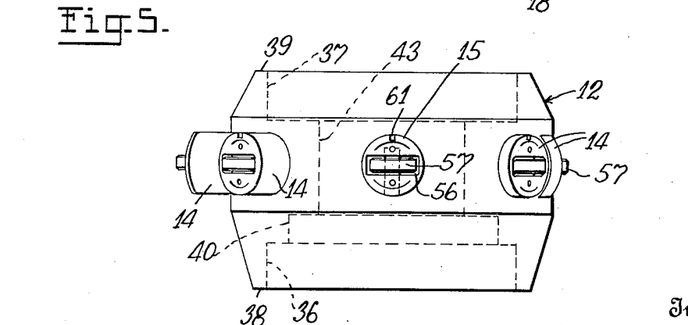
Fig. 5 is a top elevational view showing the rotating member and cooperating pistons which are employed in the engine shown in section in Fig. 3.
Figure 6:
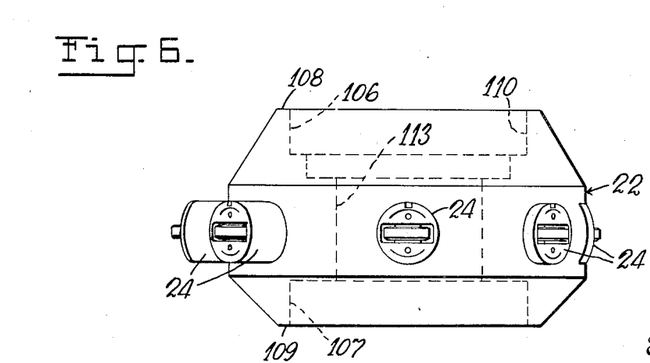
Fig. 6 is a view similar to Fig. 5 showing the rotating member and cooperating pistons employed in the engine shown in section in Fig. 4.

For such position of the eccentric member, it is seen that there is a positive pressure in the fluid on the lower side of the partition 29 in the passage member and a negative pressure or suction in the passage on the upper side. Working fluid is thus pumped by the driven engine into the driving engine through the member 28 where the pressure operates against the working faces of substantially one-half of the pistons 24; these pistons being those in the lower half of the arc of travel when the lower passage in member 28 contains working fluid under positive pressure. This pressure causes these pistons to move in a direction whereby the operating fluid can flow to a state of lower pressure. This is seen to be when the pistons move outwardly and cause a rotation of the member 22 in a clockwise direction. In Fig. 4, a piston 24 is seen to move from a position of dead centre on the right where it is in innermost position and no fluid can flow into or out of a cylinder chamber and pass successively through the positions in the lower half of the arc of travel to a position of dead centre on the left.

During this period working fluid flows into the cylinder of such piston and exerts pressure against its working face causing it to react and produce rotation in a clockwise direction until it reaches a position of dead centre on the left. When in this latter position the cylinder contains a maximum amount of working fluid, and is cut off for an instant from communication with either of the passages in the member 28. As soon as such piston has passed through the position of dead centre on the left, it begins to traverse the upper half of the arc of travel and permits a discharge of working fluid into the upper passage in the passage member through a lapping component of its port opening which establishes communication with the upper passage in member 28 past the web-wall 52. This discharge continues until such cylinder is completely discharged and its piston again moves to its innermost position which occurs at the instant that it reaches the dead centre position on the right.

The pressures in the passages of member 28 are substantially equal and opposite in magnitude where there is no fluid leakage, consequently, the effective pressure differential of the present hydraulic system is approximately the sum of these magnitudes. This sum, however, is not a constant, but varies with the load, since its pressure components are reactively transmitted through the working fluid between the engines, this sum being proportional to the load resistance to be overcome.

The rate at which the rotating member 22 revolves is also variable in the present system, since it is seen that this rate is directly dependent upon the volume of fluid displaced in the system, this displacement being dependent upon the eccentricity of the member 16 in the driven engine. When the eccentric member 16 is in neutral or position of zero eccentricity, the pistons 14 revolve without executing any reciprocating motion, so that no working fluid is displaced, consequently, there is no flow through the driving engine shown in Fig. 4 and the rotating member 22 remains stationary as long as the eccentric member remains in such neutral position.

Assuming now that the eccentric member 16 is moved slightly from the neutral position toward the left hand position of eccentricity shown in Fig. 3, such eccentric position will cause a piston 14 to be displaced in the cylinder bores 13 an axial distance corresponding to the distance between the centres of members 12 and 16. This will produce a displacement of a small amount of working fluid and cause a flow from the driven engine to the driving engine, which in turn will move the pistons 24 in the rotating member 22 at a rate which accommodates this displacement. Since the eccentricity of the member 26 with respect to the member 22 is fixed, the pistons 24 will always execute their maximum displacement. Hence they produce but slow rotation of member 22 when accommodating the slight fluid displacement caused by the rotating pistons 14 just described. By increasing the eccentricity of the member 16, the speed with which the member 22 rotates is increased until the position of maximum eccentricity for the member 16 is reached on the left. At this time the rotating member 22 attains its maximum clockwise rate of rotation.

Assuming again that the eccentric member 16 is moved from its neutral position to a position slightly on the right, it is then seen that a piston 14 passing through a position of dead centre on the left begins to move outwardly as the piston traverses the lower half of the arc of travel in a counter-clockwise direction. From this it is seen that the lower passage in the member 28 has a negative pressure, whereas the upper passage has now a positive pressure. This reversal of the conditions of pressure in the passages in member 28 reverses the application of pressure on the working faces of the pistons 24 in the member 22, so that these pistons tend to move in a reverse direction to reach a state of lower pressure, that is, they move in a counter-clockwise direction. For a position of slight eccentricity in the member 16 on the right of neutral, the rotating member 22 is caused to rotate but slowly in a counter-clockwise direction. This rate of rotation is increased upon increasing the eccentricity of the member 16 by moving it toward the right until a position of maximum eccentricity on the right is reached. At this time the member 22 is caused to rotate with a maximum angular velocity in counter-clockwise direction. By thus varying the eccentricity of the member 16 in the driven engine, the driving engine can be made to run at any desired speed in either direction. It is seen also that the torque in such case depends upon the load which reactively determines the pressure that is transmitted through the working fluid between engines. Such pressure when acting on the faces of the pistons 14 reactively determines the force of load resistance to be overcome by the driven engine and the prime mover that is coupled to it. The torque and the angular velocity of the driving engine determine the power being delivered at any instant by the present system.

When the present system is working, it is seen that only the working fluid, which is being forced through the passages in the member 28 by the pistons of members 12 and 22, is under positive pressure. While there may be working fluid in the engines that has passed the pistons 14 and 24, it is seen that this fluid is under substantially no pressure, consequently, there is substantially no tendency for working fluid to leak through joints of the casings 10 and 20.

The absence of high pressure in the system of the present invention in parts other than the working channels, avoids the necessity for providing large and strong stuffing boxes about the shafts 11 and 21 in the two engines. The absence of such stuffing boxes not only conserves space and lightens the engines, but it reduces the energy otherwise required to be spent by the prime mover in overcoming friction in the transmission system.

Also it is seen that since centrifugal force holds the pistons in the rotating members 12 and 22 against the inner rings of the anti-friction devices in both engine casings, there are tangential components of thrust causing these rings to travel with the rotating members 12 and 22 which are transmitted thereto by the pistons. It is seen further that since the inner rings, on which the ball bearings in the ends of pistons 14 and 24 track, are eccentric with respect to the rotating members 12 and 22, these ball bearings travel on these rings as though they were alternately descending and ascending an inclined plane. It is thus advantageous for each piston to have its own independent anti-friction means in operative association with the eccentric member; this involves disposing ball bearings 57 and 117 so as to bear on movable rings 66 and 126 whereby they may each execute an oscillating motion in one direction when descending the inclined plane on the rings 66 and 126, the direction of oscillation being reversed when the ascent of the inclined plane is being accomplished. This oscillation will be seen to be at different rates for different positions of the pistons since the inclined planes here have curvature. The transmission of thrust from the pistons to the ultimate eccentric members through the two-fold anti-friction means of the present invention is thus seen to reduce the friction of transmission to substantially a minimum.

From the operation of the engines thus described, it is seen that in the event the space occupied by working fluid in the passages of member 28 and in the cylinder chambers is not entirely filled with the proper amount of fluid when the prime mover is started, then as soon as the prime mover is started centrifugal force immediately operates to cause the pistons 14 to move outwardly to their fullest extent against the inner ring 66, thereby causing them to draw in one of the valves 86 and suck in a sufficient amount of working fluid to cure this deficiency. In like manner, should any heating of the working fluid take place when the system is running so that the working fluid expands, then one of the valves 80 will open to allow exit of a sufficient amount of working fluid into the casing 27, to compensate for this expansion in the operating channels. The working fluid in the casing 27 may, of course, be renewed, drawn off and replenished as conditions may indicate.

Where the working fluid is oil, this working fluid may be relied upon as the sole lubricating agent. Any suitable system of circulating lubricant to the working parts of the transmission system of the present invention may be adopted. In such case, the reserve oil in the casing 27 may be used to provide a head of oil for circulating the lubricant; suitable passages to the engines from the reservoir being provided through the engine casings for this purpose.

The driving force of the prime mover is seen to be positively transmitted to the driving shaft 21 by the system of the present invention with substantially no lost motion either when starting, running or stopping. This transmission system, of course, has the resiliency that the working fluid itself possesses which behaves like a stiff column transmitting force from a piston face in the driven engine to a piston face in the driving engine.

When starting the transmission system, it is desirable to have the eccentric member 16 in neutral as indicated above, since then the prime mover can be started independently of the load, the load being thrown upon the prime mover, and the mechanism to be driven brought up to a desired speed, by moving the eccentric member from neutral to one of its positions of eccentricity. The mechanism being driven may also be stopped by moving the eccentric member back to neutral. If the eccentric member be moved through neutral to a position of opposite eccentricity, it is seen that a braking effect is at once produced which effects a more or less sudden stopping of the mechanism being driven. The system of the present invention is thus adapted to produce braking effects, as well as driving effects, and accomplishes the complete control and transmission of power independently of any auxiliary devices, such as clutches, couplings and brakes.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In a hydraulic transmission system, the combination with mechanically driven and driving engines having casings provided with rotatable members formed with cylinders and cooperating pistons, of a passage member secured in said engine casings having ported ends disposed as hubs for said reciprocable members, means associated with said passage member dividing the same into discharge and return conduits, valve members associated with said reciprocable members about said ported hubs and cooperating with the same to effect continuity of fluid movement through said engines, lateral discharge ports communicating with said discharge and return conduits, and a rigid auxiliary member disposed about said passage member communicating with said lateral discharge ports and secured to said engine casings.

2. In a hydraulic transmission system, the combination with mechanically driven and driving engines having casings provided with rotatable members formed with cylinders and cooperating pistons, of a passage member secured in said engine casing having ported ends disposed as hubs for said reciprocable members, means associated with said passage member dividing the same into discharge and return conduits, valve members secured in said reciprocable members about said ported hubs, said ported hubs being provided with cut-off walls cooperating with said valve members, a rigid auxiliary member disposed about said passage member and secured to said engine casings, and means for permitting the discharge and suction of working fluid to and from the space in said auxiliary member about said passage member.

3. In a hydraulic transmission system, the combination with mechanically driven and driving engines having casings provided with rotatable members formed with cylinders and cooperating pistons, of a passage member secured in said engine casings having ported ends disposed as hubs for said reciprocable members, means associated with said passage member dividing the same into discharge and return conduits, valve members secured in said rotatable members about said ported hubs, said ported hubs being provided with cut-off walls cooperating with said valve members, a rigid auxiliary member disposed about said passage member and secured to said engine casings, and automatic means associated with said passage member adapted to permit the discharge of working fluid therefrom into said auxiliary member upon the attainment of a predetermined pressure.

4. In a hydraulic transmission system, the combination with mechanically driven and driving engines having casings provided with rotatable members formed with cylinders and cooperating pistons, of a passage member secured in said engine casings having ported ends disposed as hubs for said reciprocable members, means associated with said passage member dividing the same into discharge and return conduits, valve members secured in said rotatable members about said ported hubs, said ported hubs being provided with cut-off walls cooperating with said valve members, a rigid auxiliary member disposed about said passage member and secured to said engine casings, and automatic suction and discharge valves connected to said passage member and communicating with the space in said auxiliary member about said passage member, whereby the quantity of working fluid in said hydraulic system is maintained at substantially constant volume.

5. In a hydraulic transmission system, the combination with mechanically driven and driving engines having casings provided with rotatable members formed with cylinders and cooperating pistons, of a passage member secured in said engine casing having ported ends disposed as hubs for said reciprocable members, means associated with said passage member dividing the same into discharge and return conduits, valve members secured in said rotatable members about said ported hubs, said ported hubs being provided with cut-off walls cooperating with said valve members, a rigid auxiliary member disposed about said passage member and secured to said engine casings, suction-actuated valves disposed in said passage member adapted to open automatically to permit ingress of working fluid from the auxiliary member into said passage member, and safety valves disposed in said passage member to permit discharge into said auxiliary member upon the attainment of a predetermined positive pressure therein.

In testimony whereof I affix my signature.

ROBERT MAW.